April 10, 1945. H. T. LAMBERT 2,373,572
LIQUID COOLED BRAKE
Filed June 24, 1943 6 Sheets-Sheet 1

INVENTOR.
H. T. Lambert
BY
Robb & Cobb
ATTORNEYS

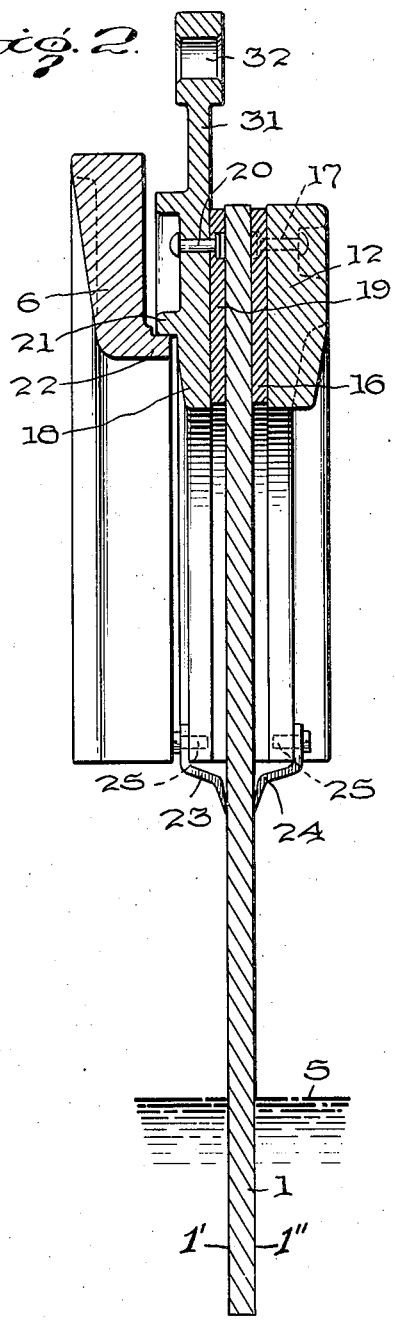
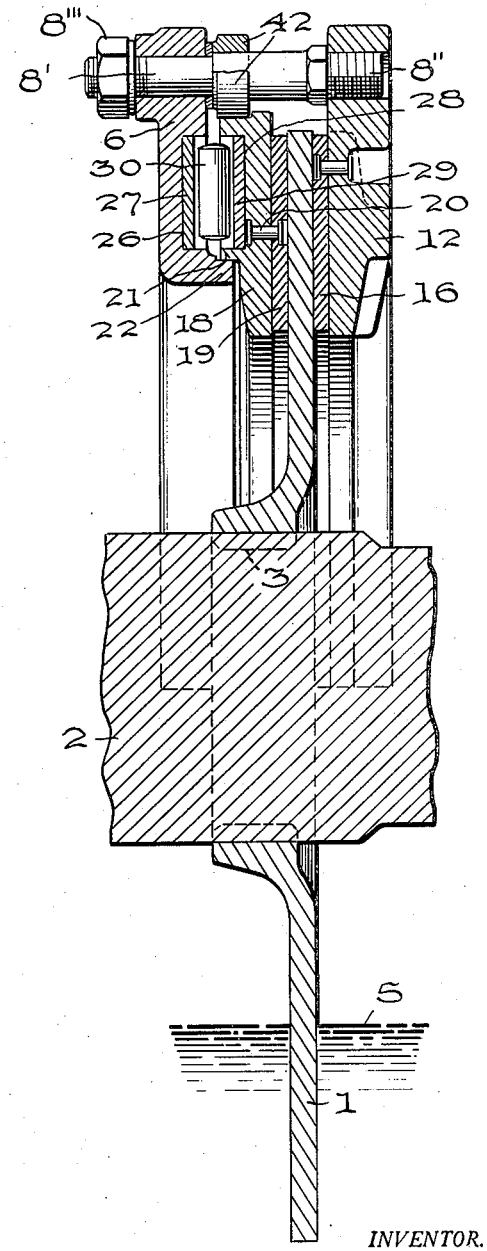

April 10, 1945.  H. T. LAMBERT  2,373,572
LIQUID COOLED BRAKE
Filed June 24, 1943  6 Sheets-Sheet 3
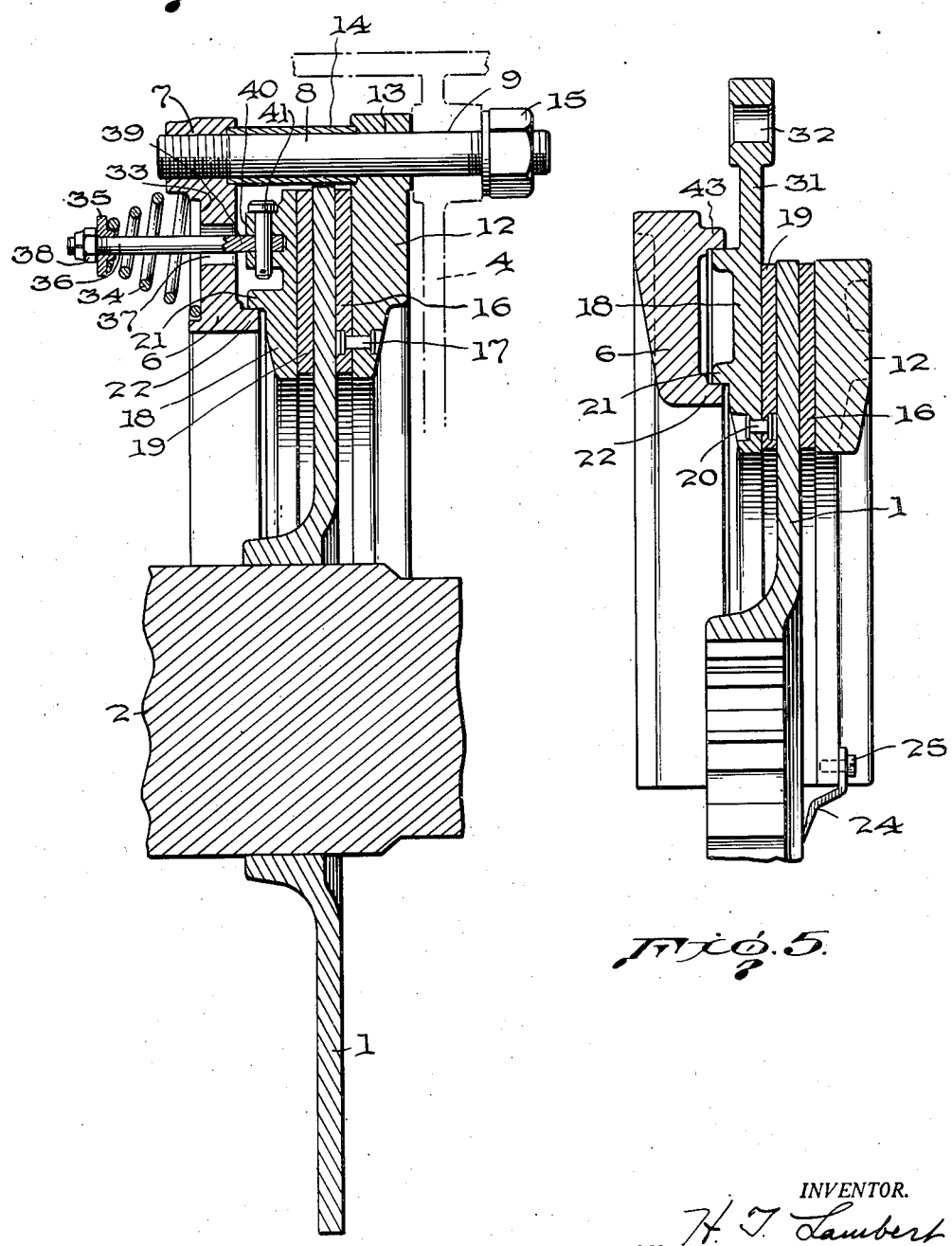
INVENTOR.
H. T. Lambert
BY
Robert Cobb
ATTORNEYS

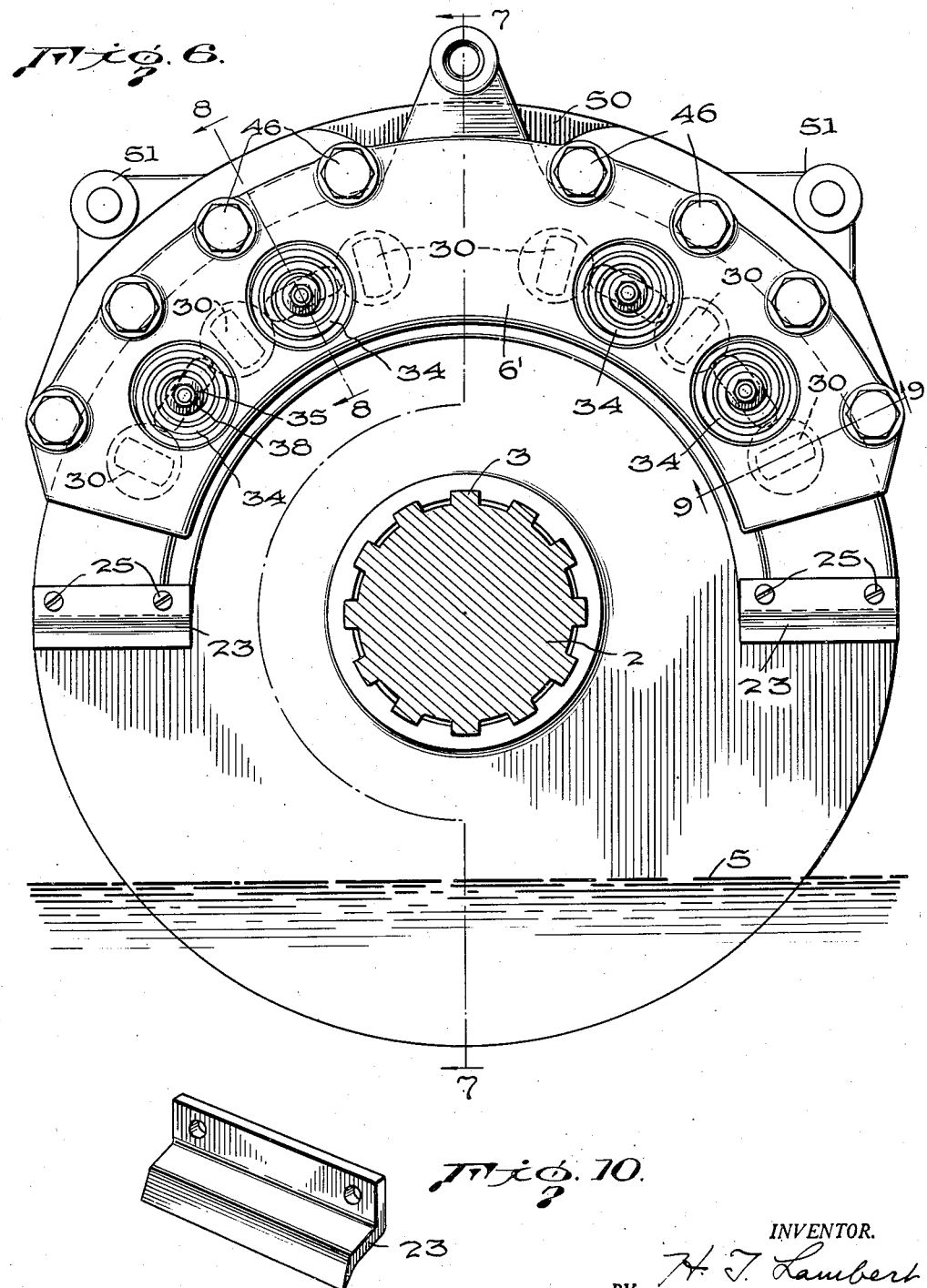

April 10, 1945. H. T. LAMBERT 2,373,572
LIQUID COOLED BRAKE
Filed June 24, 1943 6 Sheets-Sheet 5
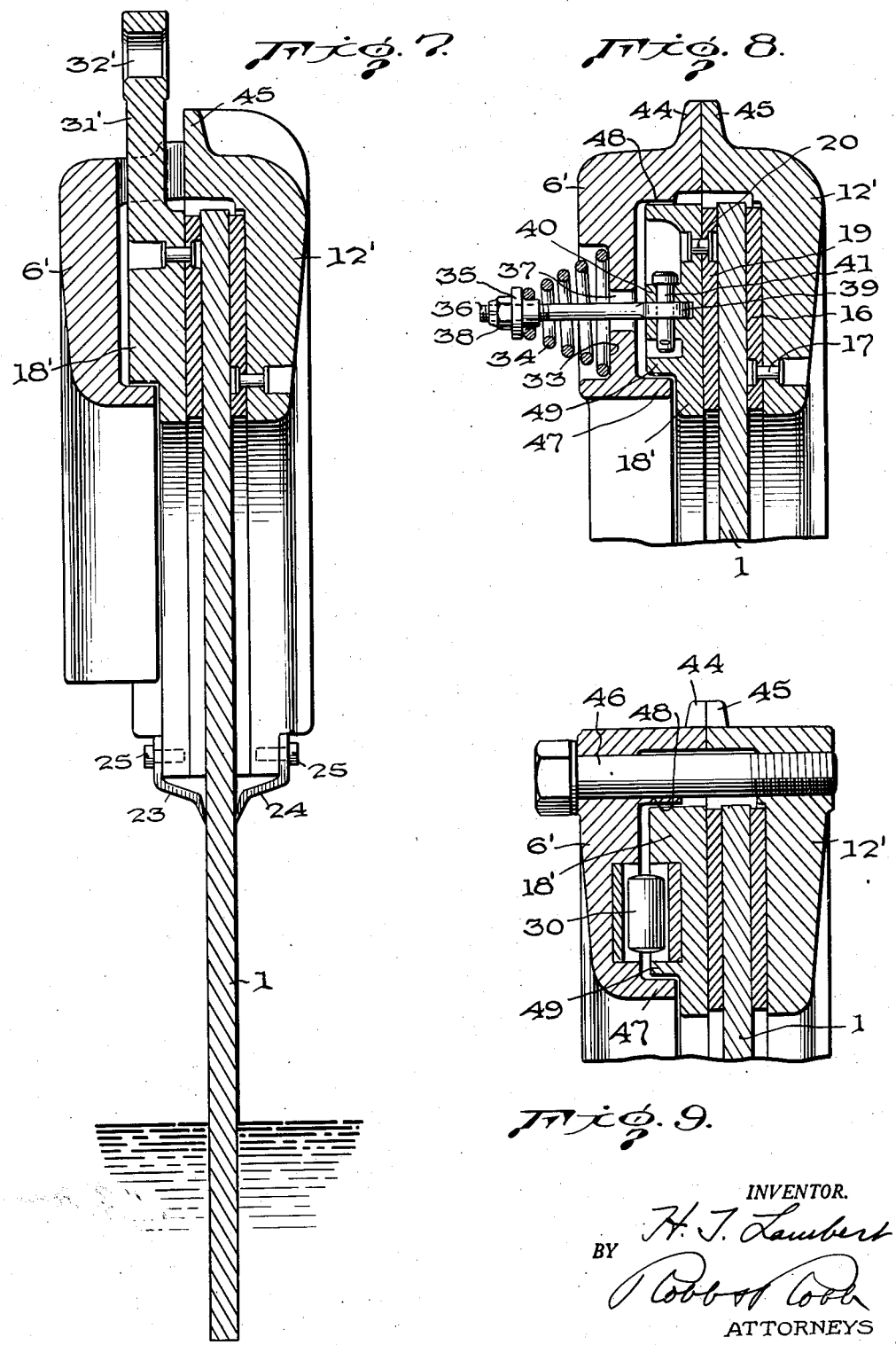
INVENTOR.
H. T. Lambert
BY
Robbt Cook
ATTORNEYS April 10, 1945.  H. T. LAMBERT  2,373,572
LIQUID COOLED BRAKE
Filed June 24, 1943   6 Sheets-Sheet 6
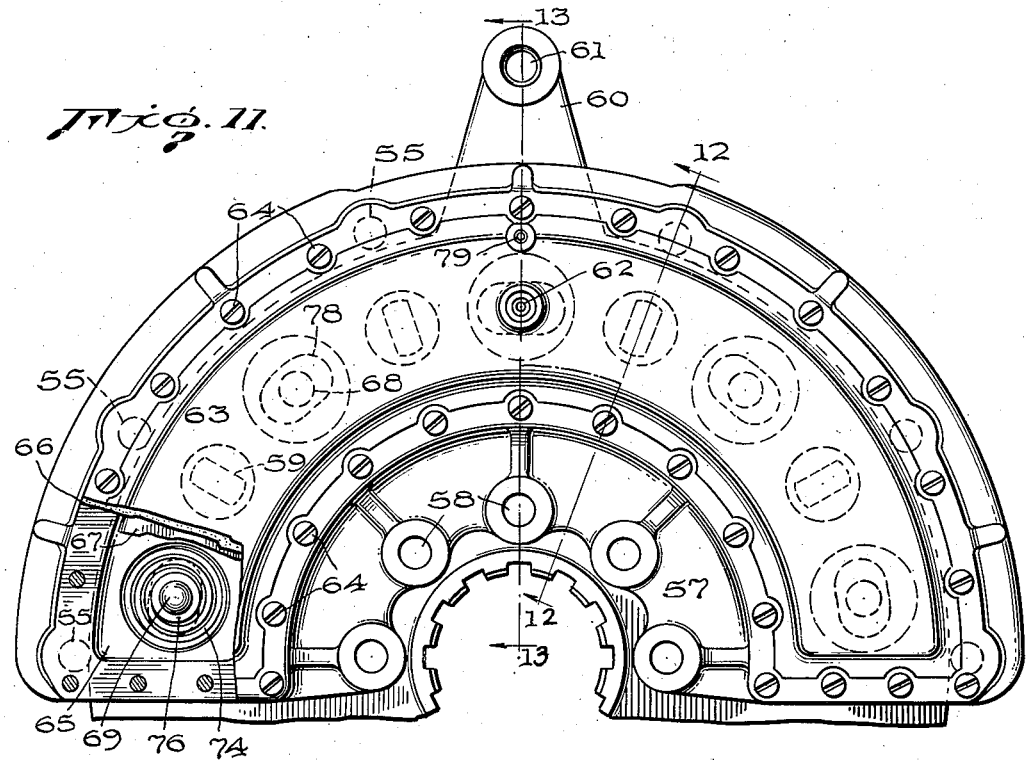
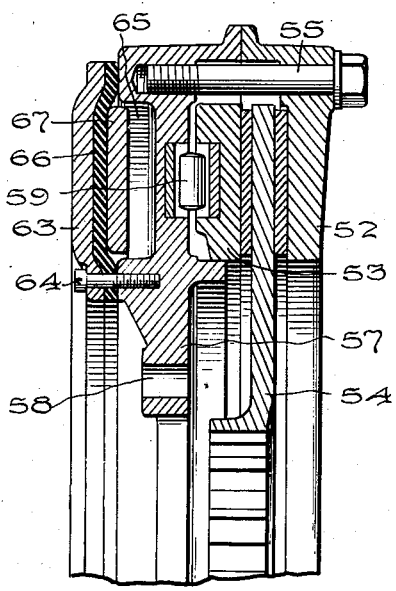
INVENTOR.
H. T. Lambert
BY
Cobb & Cobb
ATTORNEYS Patented Apr. 10, 1945

2,373,572

UNITED STATES PATENT OFFICE 2,373,572

LIQUID COOLED BRAKE

Homer T. Lambert, St. Joseph, Mich., assignor to Lambert Brake Corporation, St. Joseph, Mich., a corporation of Michigan Application June 24, 1943, Serial No. 492,063

18 Claims. (Cl. 188—72)

This invention relates to improvements in friction brakes, and more particularly to liquid cooled brakes of the disc type, having for their primary object an effective dissipation of heat and reduction of wear on the brake linings and other parts which assures long life of the brake and promotes maximum efficiency of operation.

I am aware that it has been heretofore proposed to provide brake structures in which the braking elements thereof are completely submerged in a bath of oil, or are so constructed that oil is otherwise effectively distributed over the entire area of the braking surfaces so as to either lubricate the same or otherwise act as a cooling medium for dissipating heat. However, such so-called oil brakes have never been applied to practical use, so far as I am aware, because of the fact that the continuous flood of oil at the friction surfaces tends to decrease the coefficient of friction so that there is virtually no braking or retarding effect which can be utilized for practical purposes.

The principal object of the present invention is to provide a liquid cooled brake, such as an oil brake, having one or more of its rotatable braking elements partially immersed in an oil bath, so that the heat generated during the braking action will be effectively dissipated, while at the same time the braking surfaces of the brake at the time of brake application are kept substantially free from contact with the oil or other cooling medium, in order to maintain a high coefficient of friction at the braking surfaces during the braking operation.

To the above end, I preferably utilize what is commonly known as a disc brake having one of its discs or braking elements in the form of a smooth friction ring adapted to be connected with a rotatable part to be braked so as to rotate therewith. This friction ring is so mounted as to be only partially submerged or immersed in a sump of oil or other liquid cooling medium, so that, as the friction ring rotates, the braking surfaces on opposite sides of the ring will be constantly passing into and out of the cooling medium. The braking force is applied to the friction ring at a point above the level of the liquid cooling medium, such braking force being preferably produced by means of one or more brake discs or friction elements disposed for engagement with either or both sides of the friction ring, said additional braking elements preferably having friction linings provided thereon for contact with the braking surfaces of the friction ring. These latter braking elements and their friction linings may have the form of semi-circular or crescent-shaped discs which are disposed above the level of the oil bath or other cooling medium. By virtue of such an arrangement, and with the friction ring submerged in the cooling medium to a depth not substantially greater than the radial width of the friction linings on the associated brake elements located above the oil level, the friction surfaces which produce the braking operation will be kept substantially free of the oil or other cooling medium, as will hereinafter more fully appear. To more completely assure the isolation of the effective braking surfaces from the cooling medium at the time of brake application, my invention further contemplates the provision of what I term skimmers or brushes disposed above the level of the cooling medium in the sump, which skimmers are constantly maintained in contact with the opposite faces of the friction ring so as to completely remove the oil or other cooling medium from the surfaces of the latter as these surfaces pass upwardly out of the cooling medium, and before reaching the position where these surfaces contact with the associated braking elements during the braking operation.

It should be understood that the use of the skimmers or brushes above referred to is not always essential, since this will depend in part upon the general design of the brake and the distance available between the axis of the brake assembly and the level of the cooling medium in the sump. In other words, even with the skimmers omitted, the action of gravity and/or centrifugal force tends to remove a considerable amount of the oil from the surfaces of the friction ring as these surfaces pass upwardly out of the cooling medium during rotation of the friction ring, so that even the removal of the cooling medium from the friction ring to this extent will permit an effective braking action which is a marked improvement over such negligible braking action that can be attained by completely submerged oil brakes.

By way of illustration of the advantages of my improved brake, I have found that it will operate with a heat rise of only 220 to 270°, when utilizing an oil bath as above described, and operating at a speed of 1800 R. P. M., as contrasted with a heat rise of 800 to 1000°, under the same conditions, but without the cooling medium.

While my invention was primarily developed to fill a pressing demand for a satisfactory brake for high speed military tanks, its use is not limited to this field, since it is equally effective as a highly efficient brake for any type of vehicle, including airplanes. In addition, my brake is also applicable to either light or heavy duty operation, whether for vehicular use, or for general industrial use, including such heavy duty equipment as is employed in oil well drilling, coal or ore mines, where large hoists are required.

Another object of my invention is to provide an improved brake of sturdy and compact construction, which can be operated either mechanically, hydraulically, or pneumatically, or by controls which are a combination of some or all of these where safety is the prime consideration.

Other objects and advantages of the invention will be hereinafter described, and the novel features thereof defined by the appended claims.

In the drawings:

Figure 1 is a view in side elevation of a liquid cooled brake constructed in accordance with my invention, with the housing containing the oil sump removed, and certain other parts being shown in section;

Figures 2, 3 and 4 are sectional views taken respectively on the lines 2—2, 3—3 and 4—4 of Figure 1;

Figure 5 is a sectional view generally corresponding to Figure 2, showing a slightly modified form of brake assembly;

Figure 6 is a view in side elevation, generally corresponding to Figure 1, of a further modified form of brake embodying my invention, and constructed especially for greater rigidity, as desired for heavy duty brakes;

Figures 1, 14:
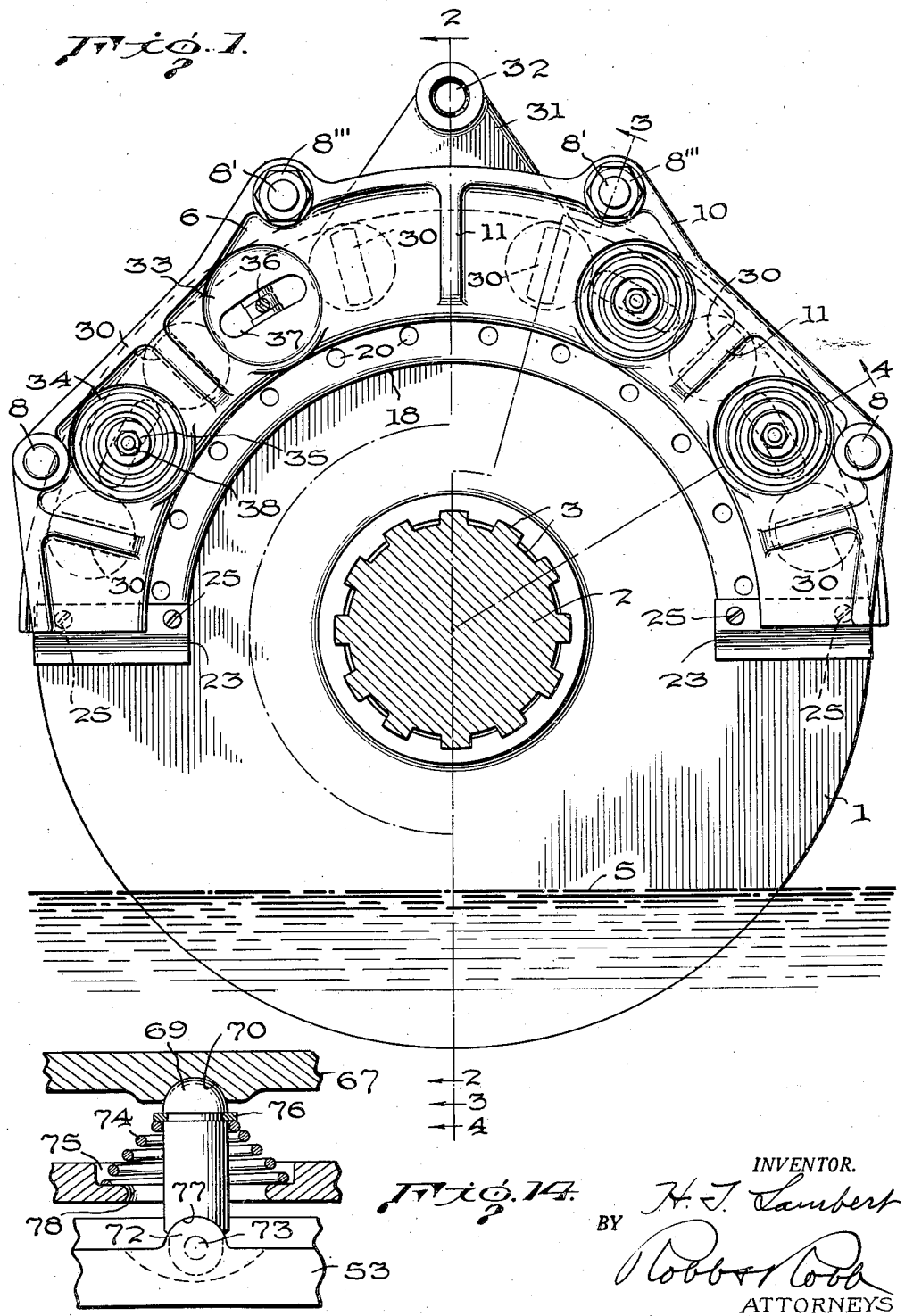

Figures 7, 8 and 9 are sectional views taken respectively on the lines 7—7, 8—8, and 9—9 of Figure 6;

Figure 10 is a detail perspective view of one of the oil skimmers or brushes;

Figure 11 is a view in side elevation of a further modified form of brake as adapted for hydraulic or pneumatic control, certain of the parts being broken away and shown in section;

Figures 12 and 13 are sectional views taken respectively on the lines 12—12 and 13—13 of Figure 11; and Figure 14 is a detail view of the thrust means by which braking thrusts are transmitted from the diaphragm pressure plate to the primary brake member.

Like reference characters designate corresponding parts in the several figures of the drawings.

For a more complete understanding of the principle of my new liquid cooled brake and of the construction thereof, reference will first be made to Figures 1 to 4 of the drawings. In these figures, 1 generally denotes a driven friction ring which is adapted to be mounted upon a shaft 2 or other rotary part to be braked, said ring 1 preferably having a splined connection with the shaft, as indicated at 3, so as to permit limited axial movement of the friction ring 1 on the shaft, while at the same time causing the friction ring to be rotated with the shaft. In the case of a brake for tanks, hoists, or the like, the shaft represented by the reference character 2 may be the power transmission shaft by means of which power is transmitted to the traction means or to the cable drum, as the case may be. On the other hand, the friction ring 1 may be suitably connected to a wheel, such as an airplane or other motor vehicle wheel, in a manner well known in the art of disc brakes. In the particular construction of the brake illustrated in Figures 1 to 4, the brake assembly is preferably mounted within the transmission housing, said housing being generally represented in broken lines in Figure 4, as indicated at 4. This housing is provided near the bottom thereof adjacent to the brake assembly with an oil sump containing a quantity of oil, the level of which is indicated by the reference character 5 in Figures 1 to 3. While oil is the preferred cooling medium employed for my brake, the invention herein is not limited thereto, since other liquid cooling media may be employed as desired, where the circumstances so permit. Accordingly, any specific reference to oil in the description and drawings of this application should be taken in the broader sense as embracing any suitable liquid cooling medium.

Due to the immersion of the lower portion of the friction ring 1 in the bath of oil, to the depth indicated by the oil level 5, the friction ring will continually run through the bath of oil so that the braking surfaces which are constituted by the opposite faces 1' and 1" of the friction ring will be continuously cooled to dissipate the heat generated by the brake during braking operations. Of course, as the friction ring passes through the oil, a film of oil will adhere to the braking surfaces 1' and 1", and one of the primary advantages of my invention is to effectively remove the oil from the braking surfaces 1', 1", so that it will not deleteriously affect the coefficient of friction in the zone of the effective braking pressure which is applied to the friction ring 1 to decelerate or stop rotation of the friction ring and the shaft 2 or other part to which the friction ring is connected.

To the above end, the braking pressure and braking friction is applied to the friction ring 1 in a zone located substantially above the oil level 5. Accordingly, the brake assembly includes a stationary power plate 6 having openings 7 therein for threadedly receiving the stud mounting bolts 8 which are extended through corresponding openings 9 in the transmission housing 4, as shown in Figure 4. As shown in the drawings, the power plate 6 has the form of a semi-circular or crescent-shaped annular disc which is preferably provided on its outer face with marginal and radial ribs 10 and 11, respectively, to reinforce this plate against strains to which it is normally subjected by the generation of heat and the pressure reactions on the plate incident to the braking operations hereinafter described. In addition to stiffening the plate, the ribs 10 and 11 aid in the dissipation of heat by radiation.

As will be seen from Figure 4, the power plate 6, in its mounted position within the housing 4, is axially spaced from the housing and is arranged in opposed spaced relation to a secondary brake disc or shoe designated 12, which latter disc also is of semi-circular or crescent form. This secondary brake disc 12 is provided with suitable openings 13 through which the mounting bolts 8 pass, and is firmly held in fixed spaced relation to the power plate 6 by means of spacing sleeves 14 disposed on the mounting bolts 8 between the power plate and the secondary brake disc. Nuts 15 on the ends of the mounting bolts 8, which pass through the transmission housing 4, serve to firmly clamp the power plate and the secondary brake disc in their fixed spaced positions just described.

The secondary brake disc is preferably provided with a friction lining 16 suitably secured to the face thereof, as by means of rivets 17, which friction lining is disposed for frictional engagement with the braking surface 1" of the friction ring 1, when the latter friction ring is moved axially on the shaft 2 towards the secondary brake disc 12. At the opposite side of the friction ring, and disposed between the power plate 6 and the friction ring, there is provided a primary brake disc or shoe 18 which generally corresponds in its semi-circular or crescent shape form to the secondary brake disc 12. This primary brake disc is also preferably provided with a friction lining 19 suitably secured thereto, as by means of rivets 20, and disposed for engagement with the braking surface 1' of the friction ring 1. The primary disc 18 is preferably provided with an axially extended pilot ring 21 having a working fit about and upon an opposed axially extended annular shoulder 22 on the power plate 6, said pilot ring and shoulder serving to maintain a coaxial relation of the primary brake disc 18 relative to the power plate 6, secondary brake disc 12, and the friction ring 1.

It will be understood from the foregoing that the spacing of the power plate 6 relative to the secondary brake disc 12 is sufficient to normally accommodate the friction ring 1 and the primary brake disc 18 which are located therebetween, and which are all normally spaced slightly from one another excepting under conditions of brake application. The brake members are preferably held together as a sub-assembly by means of the assembly bolts 8' which are threaded at one end into the secondary brake disc 12, as indicated at 8'', and extend through the power plate 6 at the other end thereof to receive a nut 8'''. The assembly bolts 8' may also be provided with suitable shoulders engaging the opposing faces of the power plate 6 and the secondary brake member 12 so as to positively maintain the fixed spaced relation between these elements in a manner corresponding to the spacing sleeves 14 on the mounting bolts 8, as will be best seen by reference to Figure 3.

To produce a braking action, it is only necessary to apply by any suitable means an axial thrust to the primary brake disc 18, whereby to urge its friction lining 19 into engagement with the friction ring 1, this axial thrust in turn imparting axial movement to the friction ring 1, and consequently producing engagement of the latter with the friction lining 16 on the secondary brake disc 12. Thus, the friction ring 1 is frictionally engaged at its opposite braking surfaces 1', 1'' by the cooperating primary disc 18 and secondary disc 12 to effectively retard or stop the rotation of the friction ring, and consequently the shaft 2 or other part to which the friction ring 1 is connected. The heat generated in the braking elements by the braking application as just described will be effectively dissipated by the oil or other equivalent cooling medium through which the friction ring runs. By reason of the location of the braking elements 12 and 18 substantially above the oil level 5, some oil adhering to the friction ring 1 as it leaves the oil bath will drop back into the oil sump, or be thrown off the friction ring by the action of centrifugal force, before it can be carried up into the zone of the frictional engagement between the friction ring 1 and the associated braking elements 12, 18. In this respect, my brake constitutes a marked improvement over other so-called oil brakes which are completely submerged in or flooded by an oil bath, and which have virtually no effective braking power. Accordingly, the position of the oil level 5 relative to the brake elements 12, 18 is quite important. This oil level 5 is preferably such that the friction ring 1 is submerged at its lower portion to a depth not substantially greater than the radial width of the friction linings 16, 19 on the brake elements 12, 18, respectively.

In order to assure the most efficient conditions for brake operation, I preferably provide skimmers or brush members 23, 24 located respectively at opposite sides of the friction ring 1, and suitably attached to the opposite ends of the primary and secondary brake members 12, 18, as by means of the machine screws 25. These skimmers 23, 24 are so constructed and arranged as to continuously and firmly bear against the braking surfaces 1', 1'' of the friction ring 1, so that any oil carried upwardly by the friction ring, as it leaves the oil bath, will be effectively removed from these surfaces before it reaches the zone of the brake members 12, 18. In order to allow for the axial movement of the friction ring 1 during the application and release of the brake, as hereinbefore described, the skimmers 23, 24 should be yieldable or otherwise provided with a yieldable lip at the point of engagement of the skimmers with the friction ring. Having in view that the braking action is effective in either direction of rotation of the friction ring 1 and shaft 2, it is preferable to attach a skimmer to both ends of each of the brake members 12, 18, as shown in the drawings, so that the oil will be effectively removed from the friction ring irrespective of the direction of rotation of the latter at the time the braking application is made.

As previously mentioned at the commencement hereof, I have found that under some conditions, the skimmers may be dispensed with without materially affecting the braking action, although under other conditions, the addition of the skimmers increases the efficiency of the brake by as much as 50%. I have also found that brakes constructed in accordance with my invention as described above and operated, for example, at speeds of 1800 R. P. M., have a heat rise of only 220 to 270° as compared with a heat rise of 800 to 1000° under the same conditions without liquid cooling.

Instead of operating the brake directly by the application of an axial thrust against the primary brake member 18, the brake may be equipped to operate as a servo brake or self-energizing brake, if preferred. Any suitable form of servo means may be employed in this connection, and by way of illustration, I have shown one form of such servo means generally corresponding to that disclosed in my prior Patent No. 2,063,443, granted December 8, 1936. As represented in Figures 1 and 3, the power plate is provided with a series of equidistantly spaced sockets 26 in each of which is received a hardened steel insert 27 provided with a groove having oppositely inclined camming surfaces, said groove extending generally diametrically across the insert and being approximately V-shape in transverse outline. Likewise, the primary brake member 18 is also provided with a series of sockets 28 in each of which is received a hardened steel insert 29 having a groove thereacross providing oppositely inclined cam faces generally corresponding to those of the inserts 27. These inserts 27, 29 mounted in the power plate and primary brake member respectively are arranged in opposed relation to each other and each pair of opposed inserts is provided with a hardened steel roller 30 therebetween normally seated in the base of the V-grooves in the opposed inserts.

In lieu of the V-grooved inserts and rollers above described, the inserts may be provided with opposed conical recesses for receiving a hardened steel ball between each pair of opposed inserts, with the balls normally seated in the bottom of the recesses as described in my prior patent hereinabove referred to.

In addition to the servo means just described, the primary brake member 18 is provided with a radially extended actuator arm 31 having provision at its free extremity 32 for connecting the same to any conventional brake operating mechanism, by means of which a slight rotation or angular displacement may be imparted to the primary brake member 18 to initially cause a slight axial thrust to be imparted to the primary brake member by the camming action exerted by the rollers 30, or the balls, as the case may be, in cooperation with the oppositely inclined faces provided on the inserts 27, 29. This initial axial thrust imparted to the primary brake member 18 serves to cause engagement of the friction linings 19, 16 with the braking surfaces 6, 7, on the rotating friction ring 1, thereby exerting a drag on the primary brake member 18 which automatically produces a further rotation or angular displacement of the primary brake member. This further angular displacement of the primary brake member in turn exerts a powerful axial thrust upon the primary brake member, thereby multiplying the braking force, according to the well known principle of servo brakes.

Provision is also preferably made for normally disengaging the brake elements from each other on release of the brake, said disengagement being effected by means now to be described.

Formed at spaced intervals in the outer face of the power plate 6 is a series of spring seats 33, said spring seats each having seated therein one end of a conical spring 34. The outer end of each spring bears against a retainer or washer 35 mounted on the outer extremity of a tie-bolt 36 extending axially through an opening 37 in the power plate, said latter opening being somewhat larger than the diameter of the tie-bolt for reasons which will later more fully appear. A nut 38 threadedly received on the outer extremity of each tie-bolt 36 serves to permit adjustment of the spring pressure exerted by each spring 34, which spring pressure normally tends to urge the tie-bolt to the left as viewed in Figure 4. The inner end of each tie-bolt 36 is flattened, as at 39, and is received in a bifurcated boss 40 through which a pin 41 extends, said pin extending through the flattened end of the tie-bolt so as to establish a pivotal connection between the tie-bolt and the primary brake member 18. Accordingly, as the primary brake member 18 assumes a limited rotative or angular movement as produced by the actuator 31 and by the servo operation of the brake, the pivotal connection of the tie-bolt with the primary brake member freely permits this movement to occur, under which conditions the tie-bolt assumes a slightly inclined position relative to the plane of the primary brake member. To this end, the openings 37 through the power plate 6 should be of sufficient size to afford the necessary clearance relative to the tie-bolts passing therethrough, without interfering with the angular displacement of these tie-bolts, which takes place incident to angular or rotative displacement of the primary brake member. Accordingly, the openings 37 in the power plate 6 are preferably elongated in the form of slots, as best seen in Figure 1.

It will be understood from the foregoing that the working fit between the pilot ring 21 on the primary brake member 18 and the annular shoulder 22 on the power plate 6 is such that the primary brake member is free to move rotatively as well as axially. During such movements of the primary brake member 18, its concentric relation respecting the other brake elements is effectively maintained both by the cooperation of the pilot ring 21 and the annular shoulder 22, as well as by a roller 42 which is preferably mounted on each of the assembly bolts 8', and which bear against the outer marginal edge of the primary brake member, as best shown in Figure 3.

By virtue of the provision of the springs 34, the primary brake member 18 is normally urged in a direction away from the friction ring 1 and the opposed secondary brake member 12, so that on release of the brake, the braking surfaces of the brake elements will be disengaged from each other to prevent undue wear of these braking surfaces, and particularly the brake linings. However, the yieldable connection established by the tie-bolts between the primary brake member 18 and the power plate 6, through the intermediary of the springs 34, freely permits operation of the brake to bring the braking surfaces into engagement with each other responsive to the initial axial thrust imparted to the primary brake member 18 by angularly displacing the primary brake member 18 with the aid of the controls (not shown), attached to the actuator arm 31.

Referring now to Figure 5, I have shown a slightly modified brake assembly wherein the power plate 6 is provided with a second annular shoulder 43, spaced radially outwardly from the shoulder 22 shown in Figure 4, this second shoulder 43 being substituted for the guide roller 42 to engage the outer margin of the primary brake member and maintain the proper alinement and concentric relation of the primary brake member 18 respecting the other parts of the brake assembly, during the axial and limited rotative or angular movements of the primary brake member. In other respects, the assembly shown in Figure 5 is the same as in Figures 1 to 4, and similar parts are designated by the same reference characters in Figure 5.

Passing now to Figures 6 to 9 inclusive, these figures show another modified form of brake which is generally similar in construction and operation as hereinbefore described. The principal difference shown by the modified brake assembly of Figures 6 to 9 resides in the use of heavier or sturdier brake elements, by virtue of which the brake is especially useful for heavy duty service. Also, in this modified arrangement, the power plate 6' and the secondary brake member 12' are constructed with matching radially extended flanges 44, 45 respectively, said flanges being arranged in abutting relation as best shown in Figure 8. Assembly bolts 46 inserted through the power plate 6' and having threaded engagement with the secondary brake member 12', serve to hold the brake together in the manner of a sub-assembly, as shown in Figure 9. The power plate 6' is also preferably provided with annular shoulders 47 and 48 for cooperation respectively with the pilot ring 49 on the primary brake member 18' and the outer margin of this member.

As in the forms of the invention previously described, the primary brake member 18' is provided with a radially extended actuator arm 31', having means 32' at its outer extremity for connecting the actuator arm to suitable brake control mechanism, by means of which the primary brake member may be initially rotated or angularly displaced slightly to cause this brake member to be cammed in an axial direction towards the friction disc 1 and the secondary brake member 12', under the influence of the servo rollers 30, following which the self-energizing or servo action takes place to produce an effective braking action. Having in view the matching engagement of the radially extended flanges 44, 45 in this modified construction shown in Figures 6 to 9, the flange 44 near the center of the power plate 6' is omitted to provide a space, as indicated at 50 in Figure 6, to permit the actuator arm 31' to extend outwardly beyond the outer margin of the brake assembly, and also to permit the angular displacement of the primary brake member 12' as hereinabove referred to. In other respects, the brake assembly generally corresponds to the constructions previously described, excepting that the brake assembly is mounted on the transmission housing, in the case of application of the brake to a power transmission shaft, by means of lugs or bosses 51 through which the mounting bolts may be inserted.

Referring to Figures 11 to 14, I have shown still another form of brake assembly in which the brake elements are constructed and arranged in a manner generally similar to the other forms of the invention, with the further provision of means for actuating the brake either pneumatically or hydraulically as well as mechanically. The hydraulic or pneumatic operating means generally corresponds in construction and operation to that disclosed in my co-pending application Serial No. 483,191, filed April 15, 1943, now Patent No. 2,354,385, July 25, 1944. Briefly describing the construction as shown in Figures 11 to 14, 52 designates the secondary brake member, 53 the primary brake member, and 54 the intermediate friction ring, these parts having substantially the same relationship as disclosed in Figures 6 to 9. 55 designates the assembly bolts which extend through the secondary brake member 52, into the power plate 56 for threaded engagement with the latter. The power plate 56 is radially extended inwardly, as at 57, and is provided with a series of openings 58 for receiving the mounting bolts by means of which the brake assembly may be mounted in operative relation to the part to be braked.

Disposed intermediate the power plate 56 and the primary brake member 53 are the servo means generally indicated at 59. The primary brake member 53 is provided as before with a radially extended actuator arm 60, having provision at 61 for attaching the same to any suitable brake control mechanism, such as, for example, the parking or emergency brake control linkage in the case of a conventional vehicle brake application.

In addition to the operation of the brake by means of the actuator 60, additional provision may be made for brake operation, such as by means of the usual foot control pedal in the case of a vehicle brake application, which foot control pedal may be connected to the brake assembly through the intermediary of suitable pneumatic or hydraulic mechanism embodying a fluid pressure medium. The fluid pressure line, in such a case, is preferably connected to an inlet 62 in a cover plate 63 suitably attached, as by means of screws 64, to the outer side of the power plate 56, which latter power plate is provided on its outer face with an annular chamber or recess 65. Extending across this chamber 65, and clamped between the cover plate 63 and the power plate 56 is a flexible diaphragm 66 of the character more specifically described in my co-pending application above referred to. Disposed in the annular recess 65 in contiguous relation to the diaphragm 66 is a pressure plate 67 which normally bears against the diaphragm at its outer side, and at its inner side bears against a plurality of thrust pins 68, each having a spherical head 69 seating in corresponding spherical sockets in the pressure plate. The opposite end of each thrust pin is flattened, as at 71, and seats in a boss 72 through which a pin 73 is inserted to establish a pivotal connection between the thrust pins 68 and the primary brake member 53. Encircling each of the thrust pins 68 is a coil spring 74 seating at one end in a well 75 at the base of the recess 65, and seating at its opposite end against a washer or other retainer 76 on the pin 68.

In actuating the brake, the fluid pressure is admitted through the inlet 62 and causes the diaphragm 66 to move to the right as viewed in Figures 12 and 13, thereby imparting corresponding movement to the pressure plate 67. As the pressure plate 67 is forced inwardly of the annular recess 65, an axial thrust is imparted thereby to the thrust pins 68, which latter pins are arranged in any suitable number at spaced intervals about the brake assembly, thus causing a corresponding axial movement of the primary brake member 53. The pressure exerted by the thrust pins 68 upon the primary brake member 53 is preferably taken by a shoulder 77 on each thrust pin which bears against the outer end of the connecting boss 72. Both the shoulder 77 and the outer end of the boss 72 are preferably arcuate in form, as best seen from Figure 14, in order to allow for angular displacement or limited rotative movement of the primary brake member 53, either during the servo brake operation which follows as a result of the application of pressure against the diaphragm 66, or as a result of a mechanical rotative movement imparted to the primary brake member 53 by the actuator 60. Such angular displacement or rotative movement of the primary brake member 53 causes canting of the thrust pins 68, which are free to rock on their spherical heads 69 seating in the sockets 70 in the pressure plate 67. The thrust pins 68 are extended through slots 78 in the power plate 56, which slots are sufficiently large to afford ample clearance to prevent interference with the canting of the thrust pins during the rotative or angular movement of the primary brake member 53.

On release of the fluid pressure acting on the diaphragm 66, the brake members are restored to their normal inactive position by the springs 74, the operation of which are obvious from the foregoing description.

79 designates a bleeder connection by means of which the pressure fluid acting on the diaphragm 66 may be bled from time to time as desired.

It will be seen from the foregoing description that the brake as shown in Figures 11 to 14 may be selectively operated either mechanically, as through means of the actuator arm 60, or hydraulically, or pneumatically, as by the introduction of a pressure fluid into the inlet 62, or by any suitable combination of such operations.

While the specific details of construction have been herein shown and described, the invention is not confined thereto as alterations may be made without departing from the spirit thereof as defined by the appended claims.

I claim:

1. A brake mechanism of the class described, comprising a rotatable friction member having a braking surface and having provision for connecting the same to a rotary part to be braked for rotation therewith about a horizontal axis, a body of liquid cooling medium in which said friction member is partly submerged, a slightly rotatable and axially movable cooperating brake member arranged for frictional engagement with the braking surface of the friction member aforesaid, said cooperating brake member lying wholly above the liquid level of the body of liquid cooling medium, and means for rotating the cooperating brake member to effect axial movement thereof and brake application.

2. A brake mechanism of the class described, comprising a rotatable friction member having a braking surface and having provision for connecting the same to a rotary part to be braked for rotation therewith about a horizontal axis, a body of liquid cooling medium in which said friction member is partly submerged, a cooperating brake member arranged for frictional engagement with the braking surface of the friction member aforesaid, said cooperating brake member lying wholly above the liquid level of the body of liquid cooling medium, and means for removing any of the liquid cooling medium adhering to the braking surface of the friction member on movement of said braking surface through the liquid cooling medium during rotation of the friction member, before the braking surface reaches the zone of frictional engagement with the cooperating brake member.

3. Apparatus as defined in claim 2, wherein the cooling medium removing means comprises a member having wiping contact with the braking surface of the friction member.

4. Apparatus as defined in claim 2, wherein the cooling medium removing means comprises a yieldable member having wiping contact with the braking surface of the friction member.

5. Apparatus as defined in claim 2, wherein the cooling medium removing means comprises a skimmer member having continuous engagement with the braking surface of the friction member.

6. Apparatus as defined in claim 2, wherein the cooling medium removing means comprises a member fixed to the cooperating brake member and having continuous wiping contact with the braking surface of the friction member.

7. A brake mechanism of the class described, comprising a plurality of relatively movable brake members having cooperating braking surfaces which, on engagement of said surfaces, produce a braking action in a limited arcuate zone, at least one of said brake members being adapted to be rotated by a part to be braked, means for actuating said last-named brake member to effect engagement and rotation as aforesaid during rotary movement of the part to be braked, other means for directly rotating said last-named brake member when the part to be braked is stationary to effect engagement of the movable brake member, and a housing having a sump of liquid cooling medium through which the braking surface of the rotatable brake member passes on rotation of the latter, the level of said liquid cooling medium in the sump being substantially spaced from the zone in which the braking action takes place on engagement of the cooperating braking surfaces aforesaid.

8. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial and slight rotatable movements thereof to cause engagement of all of the braking surfaces aforesaid and thus produce a braking action on the rotatable brake member, said fixed brake member having at one side thereof a closed chamber, a rigid pressure-operated member mounted in said chamber, and means extending through said fixed member and connecting with the axial and slightly rotatable member to effect braking action upon application of pressure to the rigid pressure-operated member aforesaid.

9. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said rotatable brake member being submerged edgewise in a body of liquid cooling medium to a depth not substantially greater than the radial dimension of the effective braking surfaces on the opposite faces of the rotatable brake member, and the cooperative brake members are positioned wholly outside of the liquid cooling medium and substantially spaced above the liquid level of the latter, in combination with means for removing the liquid cooling medium adhering to the braking surfaces of the rotatable brake member on leaving the cooling medium.

10. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said rotatable brake member being submerged edgewise in a body of liquid cooling medium to a depth not substantially greater than the radial dimension of the effective braking surfaces on the opposite faces of the rotatable brake member, and the cooperative brake members are positioned wholly outside of the liquid cooling medium and substantially spaced above the liquid level of the latter, in combination with means carried by the cooperative brake members and continuously engaging the braking surfaces of the rotatable brake member, for removing the liquid cooling medium adhering to the braking surfaces of the rotatable brake member on leaving the cooling medium.

11. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said rotatable brake member being submerged edgewise in a body of liquid cooling medium to a depth not substantially greater than the radial dimension of the effective braking surfaces on the opposite faces of the rotatable brake member, and the cooperative brake members are positioned wholly outside of the liquid cooling medium and substantially spaced above the liquid level of the latter, in combination with means attached to the opposite ends of the cooperative brake members and continuously engaging the braking surfaces of the rotatable brake member, for removing the liquid cooling medium adhering to the braking surfaces of the rotatable brake member on leaving the cooling medium.

12. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said brake actuating means including independent selectively operable mechanical and pressure-fluid-operated means.

13. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said axially movable cooperative brake member being also movable to a limited extent rotatively, and the brake actuating means including means operable responsive to limited rotation of said last-mentioned brake member for producing axial movement and brake application of said brake member and manually operated means for rotating the last-mentioned brake member to initiate the said axial movement and subsequent brake application.

14. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with th braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said brake actuating means including a stationary member of arcuate form disposed contiguous to the axially movable cooperative brake member, said stationary member having a chamber therein, a pressure-fluid-operated flexible diaphragm mounted across said chamber, a cover plate disposed over said diaphragm and having an inlet therein for admitting a pressure fluid to said diaphragm, and thrust means disposed in said chamber and operated by said diaphragm responsive to flexing of the latter under the influence of the pressure fluid, said thrust means being operatively connected with the axially movable cooperative brake member.

15. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said brake actuating means including a stationary member of arcuate form disposed contiguous to the axially movable cooperative brake member, said stationary member having a chamber therein, a pressure-fluid-operated flexible diaphragm mounted across said chamber, a cover plate disposed over said diaphragm and having an inlet therein for admitting a pressure fluid to said diaphragm, and thrust means disposed in said chamber and operated by said diaphragm responsive to flexing of the latter under the influence of the pressure fluid, said thrust means including a pressure plate in said chamber arranged in contiguous relation to said diaphragm, and a plurality of thrust pins interposed between the pressure plate and the axially movable cooperative brake member.

16. A brake mechanism of the class described, comprising a rotatable brake disc, a pair of relatively stationary brake members of semi-circular form disposed at opposite sides of said rotatable brake disc, one of said semi-circular brake members and the rotatable brake disc being movable axially relative to each other and to the other semi-circular brake member, said axially movable semi-circular brake member being also movable rotatively to a limited extent relative to the other semi-circular brake member and the rotatable brake disc, a power plate of semi-circular form disposed contiguous to said axially and rotatively movable semi-circular brake member, cam means including oppositely inclined camming surfaces carried by the power plate and the adjacent semi-circular brake member, and arranged in opposed relation to each other, with a rolling member disposed between the opposed camming surfaces, and an actuator arm radially extended from said axially and rotatively movable semi-circular brake member, said actuator arm serving to produce an initial rotative movement of said last-mentioned brake member whereby to cause engagement of both semi-circular brake members with the rotatable brake disc under the influence of the cam means aforesaid, followed by servo operation of said cam means which produces an effective braking action on the rotatable brake disc.

17. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said brake actuating means including a stationary member of arcuate form disposed contiguous to the axially movable cooperative brake member, said stationary member having a chamber therein, a pressure-fluid-operated flexible diaphragm mounted across said chamber, a cover plate disposed over said diaphragm and having an inlet therein for admitting a pressure fluid to said diaphragm, thrust means disposed in said chamber and operated by said diaphragm responsive to flexing of the latter under the influence of the pressure fluid, said thrust means including a pressure plate in said chamber arranged in contiguous relation to said diaphragm, a plurality of thrust pins interposed between the pressure plate and the axially movable cooperative brake member, and yieldable means normally opposing the brake applying thrust of said thrust pins to restore the axially movable cooperative brake member to a position disengaged from the rotatable brake member on release of the pressure acting upon the flexible diaphragm.

18. A brake mechanism of the class described, comprising a rotatable brake member of disc-like form adapted to be rotated by a part to be braked, said rotatable brake member being mounted so as to permit limited axial movement thereof and providing braking surfaces on its opposite faces, cooperative brake members respectively mounted at opposite sides of the rotatable brake member, said cooperative brake members each being of arcuate form and providing a substantially semi-circular braking surface for engagement with the braking surface of the contiguous face of the rotatable brake member, one of said cooperative brake members being fixed and the other mounted so as to permit axial movement thereof to cause engagement of all of the braking surfaces aforesaid and thus produce a braking action on the rotatable brake member, and brake actuating means for imparting such axial movement to the axially movable cooperative brake member said brake actuating means including a stationary member of arcuate form disposed contiguous to the axially movable cooperative brake member, said stationary member having a chamber therein, a pressure-fluid-operated flexible diaphragm mounted across said chamber, a cover plate disposed over said diaphragm and having an inlet therein for admitting a pressure fluid to said diaphragm, thrust means disposed in said chamber and operated by said diaphragm responsive to flexing of the latter under the influence of the pressure fluid, said thrust means including a pressure plate in said chamber arranged in contiguous relation to said diaphragm, and a plurality of thrust pins interposed between the pressure plate and the axially movable cooperative brake member, said thrust pins having operable pivotal connection at its opposite ends with the pressure plate and axially movable cooperative brake member, respectively.

HOMER T. LAMBERT.